United States Patent [19]

Jackson

[11] 4,293,672

[45] Oct. 6, 1981

[54] PROCESS FOR STABILIZING POLYESTER COMPOSITIONS

[75] Inventor: Roy J. Jackson, Houston, Tex.

[73] Assignee: Shell Oil Company, Houston, Tex.

[21] Appl. No.: 163,464

[22] Filed: Jun. 27, 1980

[51] Int. Cl.$^3$ ............................................. C08G 59/16
[52] U.S. Cl. .................................. 525/507; 525/531;
526/309; 526/320; 528/113; 528/361; 528/363;
528/365; 528/332
[58] Field of Search ................ 525/507, 531; 528/113,
528/361, 365, 363, 332; 526/320, 309

[56] References Cited

U.S. PATENT DOCUMENTS

| | | | |
|---|---|---|---|
| 2,658,885 | 11/1953 | D'Alelio | 260/53 |
| 3,336,241 | 8/1967 | Shokal | 528/406 X |
| 3,408,422 | 10/1968 | May | 526/220 |
| 3,634,542 | 1/1972 | Dowd | 260/837 R |
| 3,882,003 | 5/1975 | Mani et al. | 204/159.16 |
| 4,083,890 | 4/1978 | Drake et al. | 525/531 X |

*Primary Examiner*—Earl A. Nielsen
*Attorney, Agent, or Firm*—Norris E. Faringer

[57] ABSTRACT

The present invention provides an improved process for reducing the premature gelation during esterification of epoxy compounds containing tertiary, allylic or benzylic hydrogens, e.g., saturated epoxy resins, with ethylenically unsaturated monocarboxylic acids, e.g., acylic acid, which comprises prereacting the said epoxy compound with a hydroxylamine compound prior to the esterification step.

13 Claims, No Drawings

PROCESS FOR STABILIZING POLYESTER COMPOSITIONS

BACKGROUND OF THE INVENTION

Hydroxy-containing ethylenically unsaturated polyesters prepared from glycidyl polyethers of polyhydric phenols and ethylenically unsaturated monocarboxylic acids tend toward premature gelation. In other words, the polyesters, if stored for long periods of time before use, will increase in viscosity (gel) to a value which severely limits their use for many applications where low viscosity is important.

Such premature gelation is significantly reduced by the addition of a dialkylhydroxylamine. See, for example, U.S. Pat. No. 3,408,422, issued Oct. 29, 1968.

When, however, the epoxy compound contains tertiary, allylic or benzylic hydrogens, such as the so-called saturated epoxy resins, there appears to be a propensity toward auto-oxidation and peroxide formation. Accordingly, when such epoxy compounds are esterfied with ethylenically unsaturated acids, the reaction mixture gels during the esterification step. It has now been found that if the saturated epoxy resin is pretreated with a dialkylhydroxylamine before the esterification, the esterification can be effected without premature gelation to produce unsaturated vinyl esters exhibiting excellent stability.

SUMMARY OF THE INVENTION

This invention provides an improved process for preparing unsaturated polyesters from epoxy compounds containing tertiary, allylic or benzylic hydrogens. More particularly, the invention is directed to an improved process for reducing gelation during the esterification of saturated polyepoxides and glycidyl novolac resins with ethylenically unsaturated monocarboxylic acid which comprises pre-reacting the saturated polyepoxide or glycidyl novolac resin with a dialkylhydroxylamine.

DESCRIPTION OF THE PREFERRED EMBODIMENT

As a special embodiment, the invention provides a process for reducing premature gelation during the esterification of saturated epoxy resins or glycidyl novolac resins with ethylenically unsaturated monocarboxylic acid which comprises pre-reacting the unsaturated epoxy resin with a dialkylhydroxylamine.

Epoxy compounds which contain a number of tertiary hydrogens and therefore have a high peroxide level include the saturated epoxy resins. Accordingly, these saturated epoxides are extremely useful in the present process and include those compounds derived from polyhydric phenols and having at least one vicinal epoxy group wherein the carbon-to-carbon bonds within the six-membered ring are saturated. Such epoxy resins may be obtained by two well-known techniques, i.e., (1) by the hydrogenation of glycidyl polyethers of polyhydric phenols or (2) by the reaction of hydrogenated polyhydric phenols with epichlohydrin in the presence of suitable catalysts such as the Lewis acids and subsequent dehydrochlorination in an alkaline medium. The methods of preparation form no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by the dehydrohalogenation in the presence of caustic. When the phenol is bisphenol A, the resulting saturated epoxy compound is sometimes referred to as "diepoxidized hydrogenated bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols has been saturated.

An ideal structural formula representing the preferred saturated epoxy compounds is as follows:

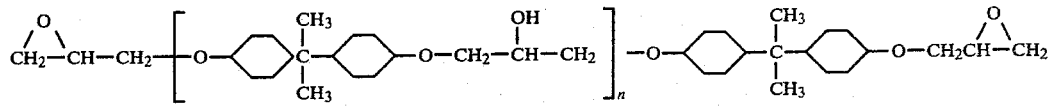

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

As noted hereinbefore, equally suitable saturated epoxy resins include the saturated resins prepared by reacting the saturated (hydrogenated) polyhydric phenol with epichlorohydrin in the presence of BF$_3$, followed by dehydrochlorination in the presence of caustic.

Other suitable epoxy compounds containing tertiary, allylic or benzylic hydrogens include the glycidyl polyethers of bisphenol F and hydrogenated bisphenol F; as well as the acrylate and methacrylate esters of fusion reaction products of liquid epoxy resins and glycidyl phenolic novolac resins. Preferred resins of this type are those of the formula:

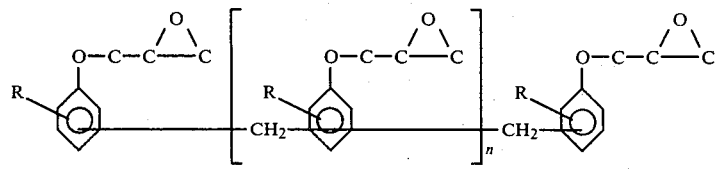

wherein R is hydrogen or an alkyl radical and n is an integar of 1 to about 10. Preparation of these polyepoxides is illustrated in U.S. Pat. No. 2,658,885.

The above-noted epoxy compounds are pre-reacted with a compound possessing at least one hydroxy amino group, i.e., a —N—OH group. The radicals attached to the free bonds may be hydrogen or any organic radical but is preferably a hydrocarbon and still more preferably an aromatic, cycloaliphatic or aliphatic hydrocarbon radical. These radicals may also be substituted if desired with non-interfering substituents such as ether, ester, halogen atoms and the like. Examples of these hydroxy amines include, among others, dibenzylhydroxylamine, benzylhydroxylamine, dibutylhydroxylamine, butylbenzylhydroxylamine, diethylhydroxylamine, dicyclohexylhydroxylamine, phenylhydroxylamine, decylhydroxylamine, 1,4-di(hydroxylamino)butane, 1,4-di(hydroxylamino) pentane, butylphenyl hydroxylamine, hexyltolyl hydroxylamine and the like.

Preferred compounds to be employed are those possessing a —C—N—OH group, and still more preferably a

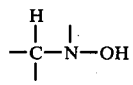

group, i.e., one with a hydrogen atom attached to the alpha carbon atom. Examples of these preferred stabilizers include ethylhydroxylamine, diethylhydroxylamine, dibutylhydroxylamine, dicyclohexylhydroxylamine, benzylhydroxylamine, dibenzylhydroxylamine, allylhydroxylamine and the like, and mixtures thereof. Coming under special consideration are those of the formula

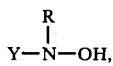

wherein Y— is

or a cyclohexyl radical or a phenyl radical or an alkyl-substituted phenyl radical, and R, $R_1$, $R_2$ and $R_3$ are hydrogen or a hydrocarbon radical containing from 1 to 12 carbon atoms.

The amount of hydroxylamine pre-reacted with the saturated polyepoxide or glycidyl novolac resin will vary widely depending upon the particular hydroxylamine, saturated epoxide and the time and temperature. In general, the amount of the hydroxylamine compound will vary from as little as 0.001 to 10 parts by weight based on the one hundred parts by weight (pbw) of epoxide. Preferred amounts will vary from about 0.01 to 3 phr.

The hydroxylamine compound is prereacted with the epoxide compound at a temperature from about room temperature (20° C.) to about 100° C. for a period from about 1 minute to about 40 minutes. A very desirable period was 90° C. for 30 minutes.

After this prereaction time, the epoxy compound is esterified with an ethylenically unsaturated organic carboxylic acid which may be aliphatic, cycloaliphatic or aromatic, and may be monocarboxylic or polycarboxylic. Examples of the acids to be utilized include acrylic acid, methacrylic acid, cyclohexene carboxylic acid, maleic acid, crotonic acid, alpha-phenylacrylic acid, tetrahydrophthalic acid, 2,4-octadienedicarboxylic acid, dodecadienoic acid and the like.

Particularly preferred acids to be utilized comprise the ethylenically unsaturated acids such as, for example, acrylic acid, methacrylic acid, crotonic acid, alpha-phenylacrylic acid, alpha cyclohexylacrylic acid, maleic acid, alpha-chloromaleic acid, tetrahydrophenalic acid, itaconic acid, fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen, tetrahydrophthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting prepolymers, are the ethylenically unsaturated monocarboxylic acids and unsaturated partial esters, and especially the unsaturated aliphatic monocarboxylic acids containing 3 to 10 carbon atoms, and the alkenyl and alkyl esters of alkenedioic acids containing up to 12 carbon atoms.

Although an esterification catalyst is not required, such a catalyst is usually employed and any known esterification catalyst can be utilized to make the instant composition.

Very suitable catalysts include the metal hydroxides such as sodium hydroxide; tin salts such as stannous octoate; phosphines such as triphenyl phosphine; the onium salts such as the phosphonium salts, including the phosphonium and ammonium halides.

Preferred catalysts to be utilized in the process comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldiallylphosphonium iodide, benzyltrimethylammonium thiocyanate, and the like, and mixtures thereof.

Preferred onium salts to be employed include those of the formula:

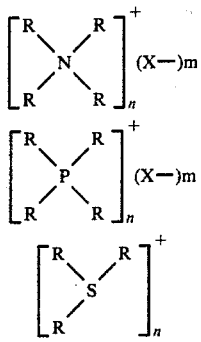

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, m is the valency of the X ion and n=m.

The amount of the pre-reacted polyepoxide and the ethylenically unsaturated monocarboxylic acid used in the esterification reaction will vary over a wide range. In general, these reactants are used in approximately chemical equivalent amounts. As used herein and in the appended claims, a chemical equivalent amount of the polyepoxide refers to that amount needed to furnish one epoxy group per carboxyl group. Under some circumstances, excess amounts of either reactant can be used. Preferred amounts range from about 0.5 to 2 equivalents of epoxide per equivalent of monocarboxylic acid.

The amount of the catalyst employed may also vary over a considerable range. In general, the amount of the catalyst will vary from about 0.05% to about 3% by weight, and more preferably from 0.1% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for sometime after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressure.

The polyester products obtained by the above process will vary from liquids to solid resins and will possess a plurality of ethylenic groups. The products will be of higher molecular weight than the basic polyepoxide from which they are formed and will possess at least two acid groups per polyepoxide unit.

These unsaturated polyesters prepared as hereinbefore described may be further modified by reacting the polyesters prepared by the esterification of polyepoxides with ethylically unsaturated carboxylic acids, with a polycarboxylic acid anhydride such as maleic anhydride. Typical examples of such modified polyesters (partial half esters) and their method of preparation is disclosed in U.S. Pat. No. 3,634,542, issued Jan. 11, 1972, and the disclosure relevant to their preparation is incorporated herein by reference.

The new polyesters will be compatible and soluble in a great variety of different materials. They will be compatible, for example, with various oils, tars, resins and the like, and with a great variety of different types of unsaturated monomers. Examples of such compatible monomers include, among others, aromatic compounds such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alphaalkylacrylic acid, butenoic acid, allybenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mixtures thereof.

The instant hydroxy-substituted polyesters may be polymerized, either alone or in combination with any of the above-noted unsaturated monomers, to form valuable polymeric products. When used in combination with the above components, the amount of the other component may vary over a wide range, but it is generally preferred to have at least 15% by weight of the polyester present. In working with components, such as the aromatic unsaturated monomers, such as styrene, it is preferred to utilize from 1% to about 65% of the dissimilar monomer and from 99% to 35% of the present employer.

The polymerization of the above-noted polyesters or mixtures of monomers may be accomplished by any suitable method. The preferred method comprises heating the monomer or mixture of monomers in the presence of a free radical yielding catalyst. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile, 2,2'-azobisisotulyamide, and the like. Particularly preferred catalysts include the diaroyl peroxide, tertiary alkyl hydroperoxides, alkyl peresters of percarboxylic acids and particularly those of the above-noted groups which contain no more than 18 carbon atoms per molecular and have a decomposition temperature below 125° C.

Other materials may also be added to the mixtures before or during polymerization. These include plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalyst selected. In general, polymerization temperatures may vary from about 20° C. to about 200° C. and more preferably from 20° C. to 125° C.

The unsaturated polyesters and their above-noted mixtures with other monomers may be utilized in a wide variety of different applications. They may be utilized in the preparation of coatings and impregnating compositions, in the preparation of adhesives for metals, wood, cement and the like, and in the preparation of reinforced composite products, such as laminated products, filament windings and the like. In this latter application, the polyester compositions are applied to the fibrous products, such as glass fibers or sheets, the material formed into the desired object and heated to effect cure of the polyester composition.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Saturated Resin A is a diglycidyl ether of hydrogenated 2,2-bis(4-hydroxyphenyl)propane having a weight per epoxy (WPE) of about 200–240 and an average molecular weight of about 380.

Epoxy Resin A is a diglycidyl ether of 2,2-bis(4-hydroxyphenyl)propane having a weight per epoxy of about 170–190 and an average molecular weight of about 350.

Phenolic Novolac Resin A is a novolac resin having an average molecular weight of 520 and a phenolic functionality of about 5.

EXAMPLE I

This example illustrates the preparation of the unsaturated polyesters wherein no premature gelation occurs in the esterification step.

Into a twelve-liter flask equipped with stirrer, thermometer, $N_2$ sparge tube and condenser were placed 6511 grams of Saturated Resin A and 4.3 grams of diethylhydroxylamine (DEHA) and the mixture heated for 40 minutes at 93° C. (200° F.). Then 1922 grams of acrylic acid, 6.8 grams of hydroquinave and 59.5 grams of tetramethylammonium chloride (TMAC) in 50%w of water with $N_2$/air sparge and the temperature raised to 116° C. (240° F.) for four hours. The temperature was then reduced to 107° C. (225° F.) and 86.9 grams of para-toluenesulfonic acid (TSA) and 37.2 grams of water were added and the mixture held at this temperature for 30 minutes. The cooled, ungelled product had the following properties:

Color (Gardner): 7
Acid valve: 0.009 eq./100 grams
Viscosity (Poise @ 25° C.): 966

This neat vinyl ester resin or vinyl ester/styrene blends can be cured with conventional free radical catalysts (peroxides) or UV-radiation to produce coatings of excellent properties.

When the ester was prepared without the pretreatment of the saturated epoxy resin with the DEHA, the ester tended to gel during the esterification step.

EXAMPLE II

Into a three-liter flask equipped as in Example I were added 1000 grams of Epoxy Resin A, 79.5 grams of Novolac Resin A, and 0.81 grams of TMAC under a $N_2$ blanket. The reaction mixture was then heated to 171° C. (340° F.) for one hour. The reaction mixture was then cooled to 121° C. (250° F.) and 0.36 grams of DEHA was added and the mixture held at this temperature for thirty minutes. Then 365.5 grams of glacial methacrylic acid, 2.86 grams (25% hydroquinave in methanol), 243.2 grams of styrene and 8.4 grams of TMAC (50%w in water) were added under $N_2$/air space and the temperature lowered to 116° C. (240° F.) and kept at this temperature for 3 hours. The temperature was then reduced to 114° C. (220° F.) and 32.5 grams of maleic anhydride and 625 grams of styrene were added and the temperature held for 15 minutes.

The cooled, ungelled vinyl resin/styrene blend had the following properties:
Acid value: 0.017 eq/100 grams
Epoxy value: 0.013 g/100 grams
Color (Gardner): 3–4

The room temperature gel time was 12 minutes when 100 grams of this resin blend was cured with 0.2 grams of methyl ethyl ketone peroxide.

When the epoxy resin was not pretreated with DEHA, the vinyl ester tended to gel during the subsequent esterification step.

What is claimed is:

1. A process for reducing the premature gelation of unsaturated polyester prepared by esterifying an epoxy compound containing tertiary, allylic or benzylic hydrogens with an ethylenically unsaturated monocarboxylic acid which comprises prereacting the epoxy compound with a hydroxylamine prior to the esterification step.

2. The process of claim 1 wherein the epoxy compound is a saturated epoxy resin.

3. The process of claim 2 wherein the saturated epoxy resin is a glycidyl polyether of a hydrogenated phenol.

4. The process of claim 3 wherein the phenol is 2,2-bis(4-hydroxyphenyl)propane.

5. The process of claim 2 wherein the epoxy resin is a hydrogenated glycidyl polyether of 2,2-bis(4-hydroxyphenyl)propane.

6. The process of claim 1 wherein the epoxy compound is an epoxy resin derived from a phenolic novolac resin.

7. The process of claim 1 wherein the hydroxylamine is diethylhydroxylamine.

8. The process of claim 1 wherein the ethylenically unsaturated monocarboxylic acid is acrylic or methacrylic acid.

9. The process of claim 1 wherein an esterification catalyst is employed.

10. The process of claim 9 wherein the esterification catalyst is an onium salt.

11. The process of claim 1 wherein the polyester is further modified with a polycarboxylic acid anhydride.

12. A curable composition comprising the composition prepared by the process of claim 1, a compatible unsaturated comonomer, and a free-radical catalyst.

13. The composition of claim 12 wherein the comonomer is styrene.

* * * * *